(12) United States Patent  
Ruan et al.

(10) Patent No.: US 12,051,081 B2
(45) Date of Patent: Jul. 30, 2024

(54) INCREMENTALLY UPDATING EMBEDDINGS FOR USE IN A MACHINE LEARNING MODEL BY ACCOUNTING FOR EFFECTS OF THE UPDATED EMBEDDINGS ON THE MACHINE LEARNING MODEL

(71) Applicant: Maplebear Inc., San Francisco, CA (US)

(72) Inventors: Chuanwei Ruan, Sunnyvale, CA (US); Ramasubramanian Balasubramanian, San Francisco, CA (US); Peng Qi, Menlo Park, CA (US)

(73) Assignee: Maplebear Inc., San Francisco, CA (US)

( * ) Notice: Subject to any disclaimer, the term of this patent is extended or adjusted under 35 U.S.C. 154(b) by 293 days.

(21) Appl. No.: 17/514,177

(22) Filed: Oct. 29, 2021

(65) Prior Publication Data

US 2023/0136886 A1    May 4, 2023

(51) Int. Cl.
*G06Q 30/02* (2023.01)
*G06Q 10/087* (2023.01)
*G06Q 30/0202* (2023.01)

(52) U.S. Cl.
CPC ....... *G06Q 30/0202* (2013.01); *G06Q 10/087* (2013.01)

(58) Field of Classification Search
None
See application file for complete search history.

(56) References Cited

U.S. PATENT DOCUMENTS

| | | | |
|---|---|---|---|
| 2019/0236525 A1* | 8/2019 | Stanley | G06N 5/01 |
| 2020/0219043 A1* | 7/2020 | Talbot | G06F 16/5854 |
| 2021/0304121 A1* | 9/2021 | Lee | G06N 5/04 |

\* cited by examiner

*Primary Examiner* — Arif Ullah
(74) *Attorney, Agent, or Firm* — Fenwick & West LLP

(57) ABSTRACT

An online concierge system uses a model to predict a user's interaction with an item, based on a user embedding for the user and an item embedding for the item. For the model to account for more recent interactions by users with items without retraining the model, the online concierge system generates updated item embeddings and updated user embeddings that account for the recent interactions by users with items. The online concierge system compares performance of the model using the updated item embeddings and the updated user embeddings relative to performance of the model using the existing item embeddings and user embeddings. If the performance of the model decreases, the online concierge system adjusts the updated user embeddings and the updated item embeddings based on the change in performance of the model. The adjusted updated user embeddings and adjusted updated item embeddings are stored for use by the model.

21 Claims, 7 Drawing Sheets

INCREMENTALLY UPDATING EMBEDDINGS FOR USE IN A MACHINE LEARNING MODEL BY ACCOUNTING FOR EFFECTS OF THE UPDATED EMBEDDINGS ON THE MACHINE LEARNING MODEL

BACKGROUND

This disclosure relates generally to updating embeddings for use in a machine learning model, and more specifically to accounting for effects of updated embeddings on the machine learning model when updating the embeddings.

In current online concierge systems, shoppers (or "pickers") fulfill orders at a physical warehouse, such as a retailer, on behalf of users as part of an online shopping concierge service. An online concierge system provides an interface to a user identifying items offered by a physical warehouse and receives selections of one or more items for an order from the user. In current online concierge systems, the shoppers may be sent to various warehouses with instructions to fulfill orders for items, and the shoppers then find the items included in the user order in a warehouse.

Many online concierge systems maintain a large inventory of items. For example, an online concierge system communicating with multiple warehouses may maintain a catalog of tens or hundreds of thousand items, if not more. While such an inventory provides users of the online concierge system with a wide selection of products, maintaining a large inventory of items makes it difficult for the online concierge system to preemptively identify items to users that are likely to satisfy a user's preferences. While many online concierge systems provide search interfaces allowing users to identify items from an online concierge system's inventory, using search terms from a user relies on an online concierge system user identifying items or attributes of items for the online concierge system to identify items for the user.

Online concierge systems may seek to simplify generation of orders for users by recommending items to users. Many conventional online concierge systems identify items to recommend to a user by determining likelihoods of the user selecting different items based on characteristics of the user and attributes of different items. When recommending items to users, conventional online concierge systems determine embeddings for users and embeddings for items, which are used as features to a model determining likelihoods of a user selecting different items. To improve accuracy of the model, the embeddings for users and items are updated at various intervals to account for changes in item attributes or in user characteristics. However, updating the embeddings may result in the updated embeddings having a different feature space than the existing embeddings, impairing performance of the model when the updated embeddings are input to the model. Conventional online concierge systems address this by retraining the model when the embeddings are updated, allowing the retrained model to account for differences in feature spaces of the existing embeddings and of the updated embeddings. However, such model retraining is computationally intensive and time intensive.

SUMMARY

An online concierge system obtains an inventory of items offered by one or more warehouses. In some embodiments, the online concierge system obtains an inventory from each warehouse, with an inventory from a warehouse identifying items offered by the warehouse. The inventory includes different entries, with each entry including information identifying an item (e.g., an item identifier, an item name) and one or more attributes of the item. Example attributes of an item include: one or more keywords, a brand offering the item, a manufacturer of the item, a type of the item, a price of the item, a quantity of the item, a size of the item and any other suitable information. Additionally, one or more attributes of an item may be specified by the online concierge system for the item and included in the entry for the item in the inventory. Example attributes specified by the online concierge system for an item include: a category for the item, one or more sub-categories for the item, and any other suitable information for the item.

From the information about various items in the inventory and information stored by the online concierge system describing prior interactions by users of the online concierge system selecting items, the online concierge system generates an item embedding for each item. The online concierge system generates the item embedding for an item by applying an item model to attributes of the item. In some embodiments, some dimensions for an item embedding are determined from different words or phrases received by the online concierge system as terms from users in interactions where the user selected the item. Frequencies with which words or phrases were received by the online concierge system in interactions where a user selected the item are used when determining one or more dimensions of the item embedding for the item. The online concierge system maintains a stored vocabulary of words for determining item embeddings in various embodiments. Categories associated with the item by the online concierge system, such as a department within a warehouse including an item may also be used to determine one or more dimensions of an item embedding for an item. When determining values of dimensions of embeddings for an item, the online concierge system may evaluate interactions in which items were selected by users that occurred within a specified time interval (e.g., within 180 days of a current date). Alternatively or additionally, the online concierge system orders items by dates when a user purchased or selected the items and generates embeddings for items having at least a threshold position in the ordering, allowing generation of the embeddings for more recently purchased or selected items.

The online concierge system additionally generates user embeddings for users of the online concierge system by applying a user model to characteristics of the user. For example, the online concierge system identifies a user from whom a request for one or more items was received and generates the embedding for the user. Alternatively, the online concierge system periodically generates embeddings for users who have accessed the online concierge system or for users who have accessed the online concierge system within a specific time interval (e.g., within a threshold amount of time of a current time). To generate the user embedding for the user, the online concierge system identifies items selected or purchased by the user and retrieves embeddings for the identified items. In some embodiments, the online concierge system identifies items that the user purchased within a particular time interval (e.g., within 180 days of a current date), retrieves embeddings for the identified items, and generates a user embedding for the user with one or more dimensions of the embeddings determined from different products and values of the dimensions determined from frequencies with which the user purchased products corresponding to the dimensions. In various embodiments, the online concierge system averages values of the dimensions based on a number of purchases by the user and generates the user embedding for the user from the average values of the dimensions. Additionally, one or more dimensions of the user embedding for the user are determined from characteristics of the user maintained by the online concierge system. Example characteristics of a user include one or more dietary preferences or restrictions of the user, frequency of purchases from the warehouse by the user, and any other suitable information maintained by the online concierge system.

Additionally, the online concierge system maintains a trained model that receives a user embedding and an item embedding as input, with the model outputting a probability of the user corresponding to the user embedding performing an interaction with an item corresponding to the item embedding. For example, the trained model outputs a probability of the user purchasing the item or outputs a probability of the user selecting a content item corresponding to the item. In various embodiments, the user embedding from the user model and an item embedding from the item model have an equal number of dimension, with the model determining the probability of the user performing an interaction with an item based on a measure of similarity between the user embedding and the item embedding, such as a dot product of the user embedding and the item embedding.

As further described above, the user embeddings and the item embeddings account for interactions by users with items, which change over time. To account for these interactions, the online concierge system generates updated item embeddings and generates updated user embeddings. In various embodiments, the online concierge system generates updated item embeddings at a periodic interval, such as daily. In some embodiments, updated item embeddings for items are generated at different intervals for different warehouses. Similarly, updated user embeddings may be generated at a periodic interval, such as daily, in various embodiments. The online concierge system uses the same periodic interval to generate updated item embeddings and to generate updated user embeddings in some embodiments, while in other embodiments, different periodic intervals are used for generating updated item embeddings and for generating updated user embeddings.

However, generating updated item embeddings may change the latent space of the updated item embeddings relative to the item embeddings, while generating updated user embeddings may similarly change the latent space of the updated user embeddings relative to the user embeddings. Such changes in the underlying latent space of the item embeddings or of the user embeddings decreases accuracy of the trained model when applied to the updated user embeddings and to the updated item embeddings. Retraining the trained model when updated item embeddings are generated or when updated user embeddings are generated is computationally extensive.

To maintain accuracy of the trained model while updating the item embeddings and the user embeddings, the online concierge system generates updated item embeddings by initializing item embeddings to the previously generated item embeddings, which initializes weights between layers of a network comprising the item model based on the previously generated item embeddings and applying the item model to new training data including a plurality of examples of items and determining an error term from a difference between the label applied to the example of the training data and an output of the item model. The error term may be generated through any suitable loss function, or combination of loss functions, in various embodiments. The online concierge system repeatedly backpropagates the one or more error terms from the label applied to an example of the new training data and the output of the item model for the new training data through layers of a network comprising the item model until the loss function satisfies one or more criteria. In response to the loss function satisfying the one or more criteria and the online concierge system stopping the backpropagation of the one or more error terms, the online concierge system stores the set of parameters for the layers of the network. When the item model is applied to an item, an updated item embedding is generated from weights of the layers of the item model, such as weights of connections between nodes in the network as the set of parameters.

Similarly, the online concierge system generates updated user embeddings by initializing user embeddings to the previously generated user embeddings, which initializes weights between layers of a network comprising the user model based on the previously generated user embeddings and applying the user model to new training data including a plurality of examples of users and determining an error term from a difference between the label applied to the example of the training data and an output of the user model. The online concierge system repeatedly backpropagates the one or more error terms from the label applied to an example of the new training data and the output of the user model for the new training data through layers of a network comprising the user model until the loss function satisfies one or more criteria. In response to the loss function satisfying the one or more criteria and the online concierge system stopping the backpropagation of the one or more error terms, the online concierge system stores the set of parameters for the layers of the network. When the user model is applied to a user, an updated user embedding is generated from weights of the layers of the user model, such as weights of connections between nodes in the network as the set of parameters.

To evaluate the effect of the updated item embeddings and the updated user embeddings on the trained model, the online concierge system obtains a set of evaluation data. The evaluation data includes examples each comprising a combination of an item and a user, with a label applied to each example indicating whether the user performed the specific interaction corresponding to the trained model to the item. The online concierge system applies the trained model to a combination of an updated item embedding and an updated user embedding corresponding to a combination of an item and a user of the evaluation data and determines an updated error term from a label applied to the combination by the evaluation data and an output of the trained model applied to the combination of the updated item embedding and the updated user embedding. The online concierge system also applies the trained model to an item embedding and a user embedding previously generated for the combination of the item and the user of the evaluation data and determines an existing error term from a label applied to the combination by the evaluation data and an output of the trained model applied to the combination of the item embedding and the user embedding. In various embodiments, the updated error term and the existing error term are generated using any suitable loss function, such as a log loss function.

The online concierge system determines a difference between the updated error term and the existing error term for the trained model when applied to the combination of the item and the user of the evaluation data. Additionally, the online concierge system determines whether the difference between the updated error term and the existing error term equals or exceeds a threshold value. For example, the online concierge system determines whether the difference between the updated error term and the existing error term equals or exceeds zero. The comparison of the difference between the updated error term and the existing error term to the threshold value determines whether the updated user embedding and the updated item embedding decreases performance of the trained model relative to use of the item embedding and the user embedding.

In response to determining the difference between the updated error term and the existing error term is not less than the threshold value, the online concierge system determines the updated item embedding and the updated user embedding decreased performance of the trained model relative to use of the item embedding and the user embedding. To offset the reduced performance of the trained model, the online concierge system adjusts the updated item embedding and adjusts the updated user embedding. In various embodiments, the online concierge adjusts the updated item embedding using an adjustment term based on the difference between the updated error term from application of the trained model to the combination of the updated item embedding and the updated user embedding and the existing error term from application of the trained model to the item embedding and the user embedding. For example, the adjustment term is based on a gradient of the difference between the updated error term and the existing error term. In various embodiments, an adjustment weight is applied to the adjustment term, and an updated item embedding is adjusted based on a product of the adjustment weight and the adjustment term for the modified item embedding. For example, the updated item embedding is adjusted by decreasing the updated item embedding by the product of the adjustment weight and the adjustment term for the modified item embedding.

Similarly, the online concierge system adjusts the updated user embedding using an adjustment term based on the difference between the updated error term from application of the trained model to the updated user embedding and to an updated item embedding and the existing error term from application of the trained model to the user embedding and to the item embedding. For example, the adjustment term is based on a gradient of the difference between the updated error term and the existing error term. In various embodiments, the adjustment weight is applied to the adjustment term, and an updated user embedding is adjusted based on a product of the adjustment weight and the adjustment term for the modified user embedding. For example, the updated user embedding is modified by decreasing the updated user embedding by the product of the adjustment weight and the adjustment term for the modified user embedding. In various embodiments, the adjustment weight is determined by the online concierge system using any suitable method. In some embodiments, the adjustment weight is a value determined by the online concierge system to satisfy one or more criteria and stored by the online concierge system. For example, the online concierge system applies the trained model to an adjusted updated embedding (an adjusted updated user embedding or an adjusted updated item embedding) and determines a difference between an adjusted error term from application of the trained model to a combination of an item and a user from the exploration data using the adjusted updated item embedding or the adjusted updated user embedding and the existing error term for the trained model when applied to a combination of the item and the user of the evaluation data. In response to the difference between an adjusted error term and the existing error term equaling or exceeding a maximum value, the online concierge system changes the adjustment weight and re-determines the adjusted item embedding or the adjusted user embedding, as further described above using the changed adjustment weight. The online concierge system iteratively changes the adjustment weight based on the difference between the adjusted error term and the existing error term equaling or exceeding a maximum value until the difference between the adjusted error term and the existing error term is less than the maximum value. The online concierge system stores the adjusted updated user embedding or the adjusted updated item embedding.

In response to determining the difference between the updated error term and the existing error term is less than the threshold value, the online concierge system 102 determines the updated item embedding or the updated user embedding do not decrease performance of the trained model relative to use of the item embedding and the user embedding. Hence, the online concierge system stores the updated item embedding or the updated user embedding without additional modification for subsequent use. This allows the online concierge system to subsequently use the updated user embedding or the updated item embedding when the accuracy of the trained model is not decreased by the updated user embedding or by the updated item embedding.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
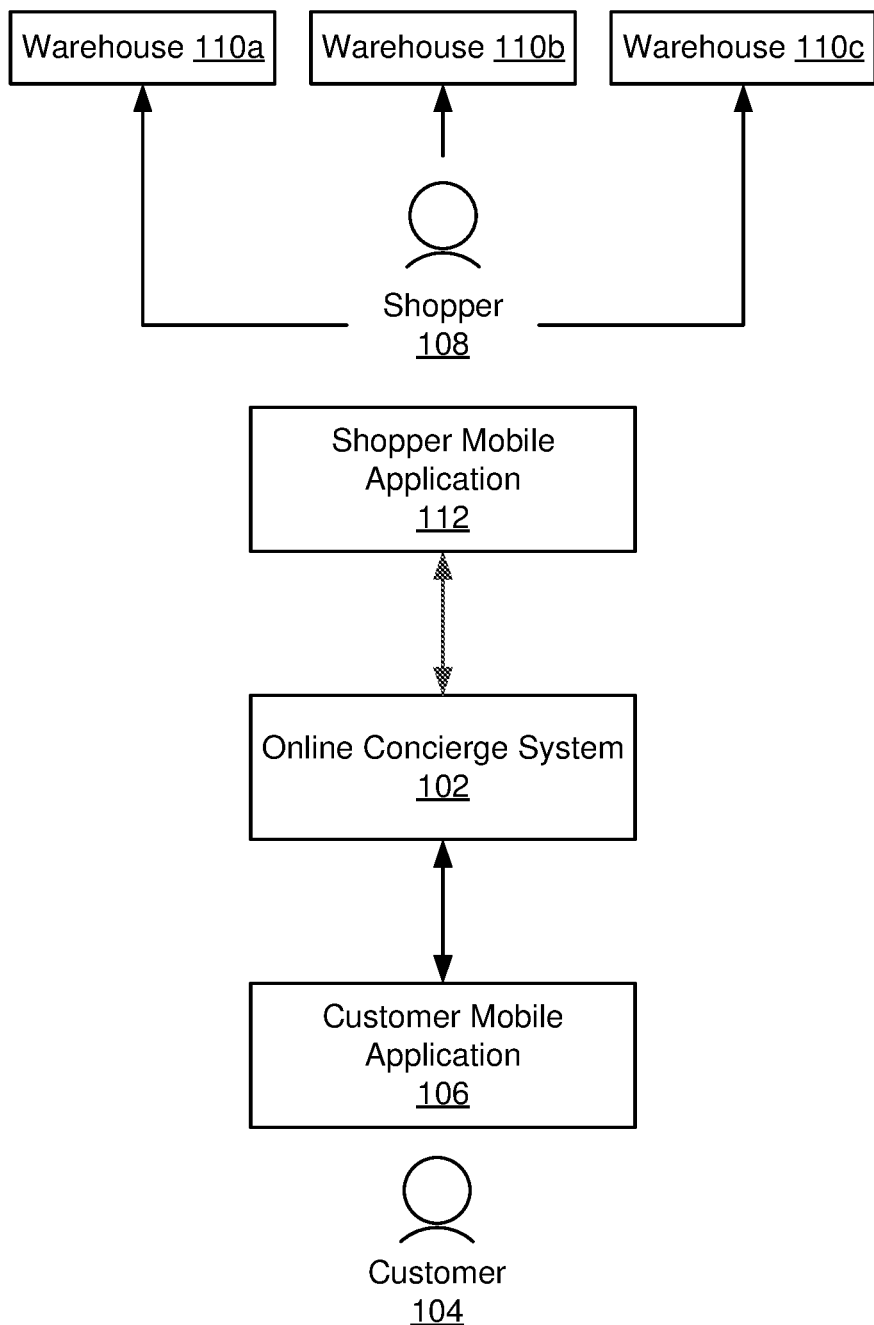
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110*a*," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 to place the order; the CMA 106 is configured to communicate with the online concierge system 102.

The online concierge system 102 is configured to transmit orders received from users 104 to one or more shoppers 108. A shopper 108 may be a contractor, employee, other person (or entity), robot, or other autonomous device enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
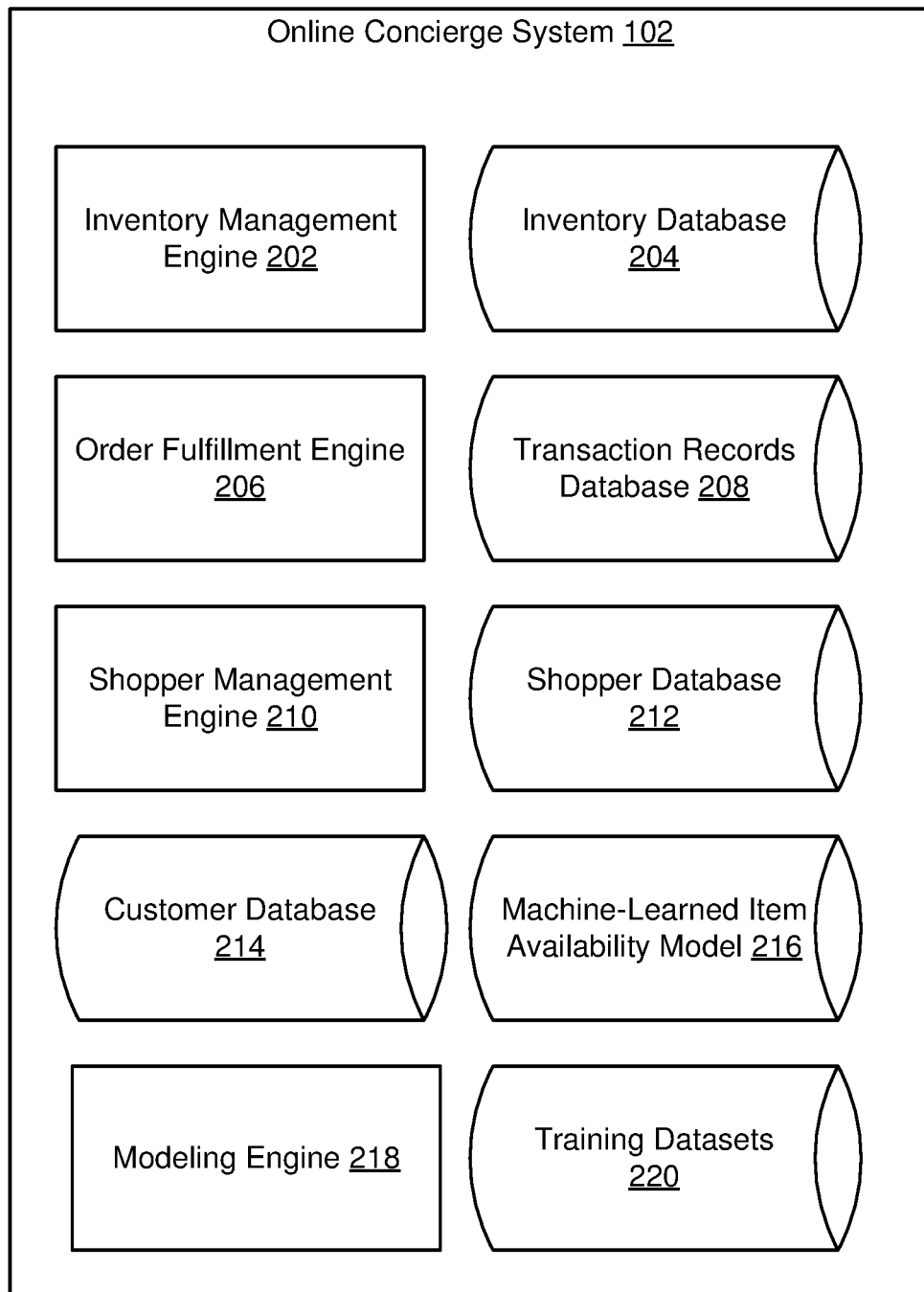
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on.

In various embodiments, the order fulfillment engine 206 generates and maintains an item graph, further described below in conjunction with FIGS. 5 and 6. The item graph identifies connections between pairs of items and attributes of items and between pairs of attributes of items. A connection between an item and an attribute indicates that the item has the attribute to which the item is connected. The attributes of an item may be specified by information describing the product from a warehouse 110 providing the item or determined by the order fulfillment engine 206 based on information about the item received from the warehouse 110. A connection between an attribute and an additional attribute indicates that the attribute and the additional attribute have both occurred in one or more previously received orders for items. For example, the attribute is connected to the additional attribute if a previously received order included an item having the attribute and having another item having the additional attribute. Similarly, the attribute is connected to the additional attribute if a previously received order included an item having both the attribute and having the other attribute. As further described below in conjunction with FIG. 5, the order fulfillment engine 206 uses the item graph to generate search results of items in response to a search query received from a user 104, allowing the order fulfillment engine 206 to leverage information about different attributes and items to increase a likelihood of identifying items that at least partially match the search query for inclusion in an order.

Machine Learning Models

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a user or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the user 104 and/or shopper 108, as described in further detail below.

The training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Additionally, the modeling engine 218 maintains a user model and an item model that generate a user embedding for a user and an item embedding for an item, respectively. The user model generates the user embedding for the user based on prior purchases by the user, preferences of the user, and any other suitable characteristics of the user. The item model generates the item embedding for the item based on different words or phrases received by the online concierge system 102 as terms from users in interactions where the user selected the item, one or more categories associated with the item, popularity of the item at a warehouse 110, or any other suitable attributes of an item. In various embodiments, the user model and the item model are components of a similarity model, as further described below in conjunction with FIG. 6. The similarity model determines a measure of similarity between an item embedding and a user embedding generated by the item model and by the user model, respectively. In various embodiments, the user embedding for a user and the item embedding for an item have an equal number of dimensions, and the similarity model generates the measure of similarity between the user and the item based on a dot product or other measure of similarity between the user embedding for the user and the item embedding for the item. In various embodiments, the modeling engine 218 trains the user model and the item model when training the similarity model, using labeled training data, as further described below in conjunction with FIG. 5. As further described below in conjunction with FIG. 5, the modeling engine 218 trains the model based on interactions with items by users, which may modify or update the user model or the item model. Updating the user embeddings and the item embeddings based on more recent interactions by items with users is further described below in conjunction with FIGS. 5 and 7.

From a user embedding for the user and an item embedding for an item, a separate trained model maintained by the modeling engine 218 determines a probability of the user performing a specific interaction with the item, as further described below in conjunction with FIG. 4. In various embodiments, the trained model receives as input other features in addition to the item embedding and the user embedding and determines the probability of the user performing the specific interaction with the item based on the user embedding, the item embedding, and the other features received as input. Examples of specific interactions with an item include: purchasing the item, including the item in an order, selecting a content item corresponding to the item, saving the item, requesting additional information about the item, or any other suitable interaction. The trained model receives a user embedding and an item embedding and determines a probability of the user performing the specific interaction based on the user embedding and the item embedding. When the modeling engine 218 updates a user embedding or an item embedding, the modeling engine 218 accounts for one or more effects of the updated user embedding or the updated item embedding on performance of the trained model in predicting the likelihood of the user performing the specific interaction with the item as further described below in conjunction with FIGS. 5 and 7. Hence, the modeling engine 218 adjusts one or more of the updated user embedding or the updated item embedding in response to determining that the updated user embedding or the updated item embedding decrease performance of the trained model in predicting the likelihood of the user performing the specific interaction with the item so adjustment of the updated user embedding or of the updated item embedding offsets decreased performance of the trained model when applied to the updated user embedding or to the updated item embedding.

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previous delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108, as described in further detail with reference to FIG. 5. Following updating of the training datasets 220, a modeling engine 218 may retrain a model with the updated training datasets 220 and produce a new machine-learned item availability model 216.

Customer Mobile Application

Figure 3A:
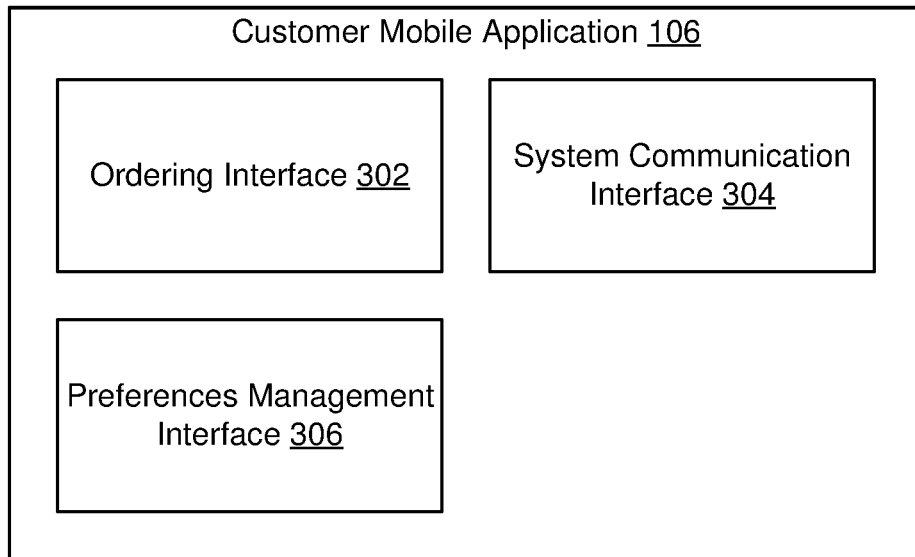
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the user 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the user 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Shopper Mobile Application

Figure 3B:
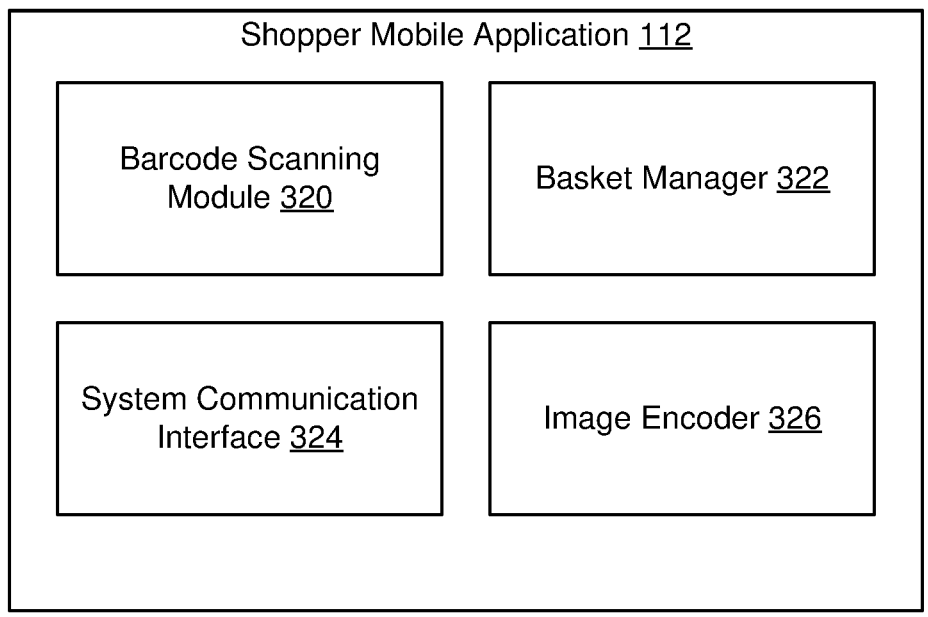
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Training a Model to Determine a Probability of a User Purchasing an Item

Figure 4:
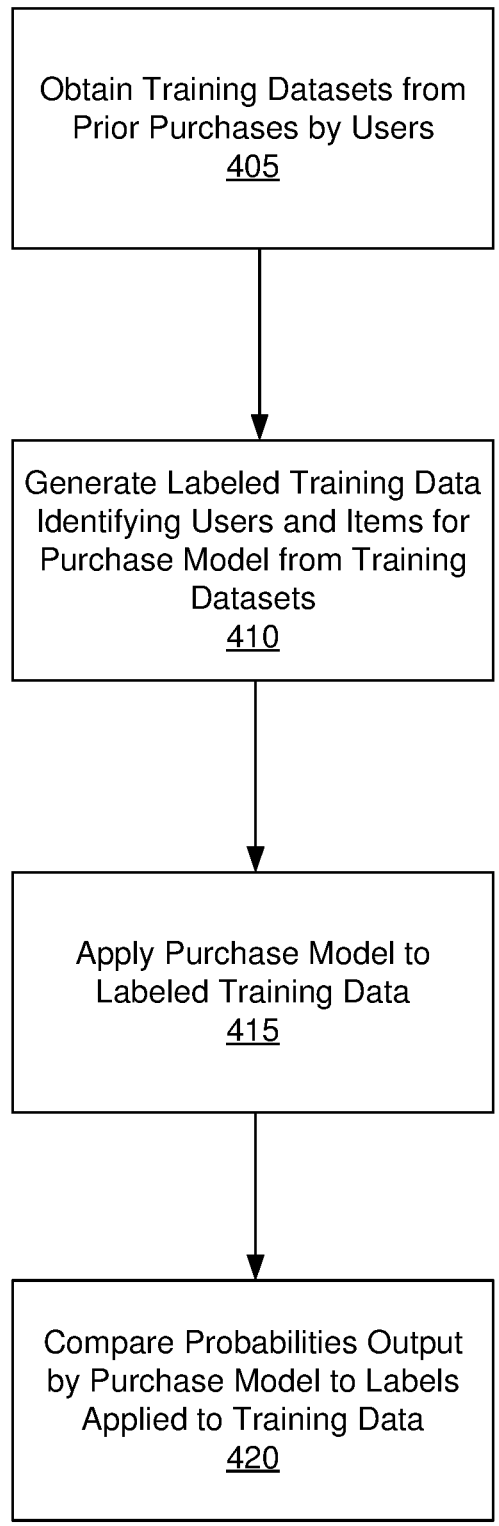
FIG. 4 is a flowchart of a process for training a model generating a probability of a user performing a specific interaction with an item, according to one embodiment.

FIG. 4 is a flowchart of a method for an online concierge system 102 training a model to determine a probability of a user purchasing an item based on an embedding for the user and an embedding for an item. In various embodiments, the method includes different or additional steps than those described in conjunction with FIG. 4. Further, in some embodiments, the steps of the method may be performed in different orders than the order described in conjunction with FIG. 4. The method described in conjunction with FIG. 4 may be carried out by the online concierge system 102 in various embodiments.

The modeling engine 218 maintains an item model configured to generate an embedding for an item, as well as a user model configured to generate an embedding for a user.

As used herein, an "embedding" refers to descriptive data associated with an item or a user that indicates attributes or characteristics of the item or the user. Example attributes of an item identified by an embedding for an item include words or phrases provided by users to identify the item, one or more categories associated with the item, popularity of the item at a warehouse 110, or any other suitable attributes. Example characteristics of a user identified by an embedding for the user include products purchased by the user, categories associated with products purchased by a user, preferences of the user, restrictions of the user, warehouses 110 from which the user purchased items, and any other suitable characteristics. In some embodiments, an embedding for an item or for a user comprises a feature vector having multiple dimensions, with each dimension including a value describing one or more attributes of the item or characteristics of the user. The item model and the user model may be machine learning models in various embodiments. The modeling engine 218 separately maintains the user model and the item model, so the user model and the item model are separate and discrete models. In various embodiments, the user model and the item model are separately trained or updated by the modeling engine 218, while in other embodiments the modeling engine 218 trains or updates the user model and the item model together. The user model and the item model may be any machine learning model, such as a neural network, boosted tree, gradient boosted tree or random forest model.

Additionally, the modeling engine 218 trains and maintains a model that generates a probability of a user performing a specific interaction with an item, such as purchasing the item. The model receives as input an item embedding for an item generated by the item model and a user embedding for a user generated by the user model and outputs a probability of the user performing the specific interaction with the item.

To train the model, the modeling engine 218 obtains 405 training datasets from stored transactions by one or more users with the online concierge system 102, such as data from the transaction records database 208. For example, the modeling engine 218 identifies purchases made by users within a specific time interval from the transaction records database 208. In some embodiments, the modeling engine 218 identifies purchases within a specific time interval and made by users who have previously made at least a threshold number of purchases via the online concierge system 102. A dataset retrieved from the transaction records database 208 includes information identifying a user making a purchase, items included in the purchase, a warehouse 110 from which the purchase was made, and temporal information (e.g., a date, a time) of the purchase. Other datasets retrieved from the transaction records database 208 include information describing different interactions with items by users, such as including one or more items in an order, selecting content items corresponding to one or more items, requesting additional information about one or more items, or any other suitable interactions.

From information in a training dataset identifying purchases (or other interactions), the modeling engine 218 selects a purchase and identifies a user who performed the purchase, items included in the purchase, and a warehouse 110 from which the items were purchased. The modeling engine 218 uses information about the selected purchase to generate 410 labeled data for training the model. To generate 410 training data for the model, the modeling engine 218 associates a label indicating whether the user performed the specific interaction with an item with a combination of attributes of the item and characteristics of the user. For example, the training data includes examples each comprising a combination of attributes of the item and characteristics of the user to which a label was applied indicating whether the specific interaction was or was not performed by the user with the item. While this allows the modeling engine 218 to generate 410 labeled data for items for which users performed the specific interaction (e.g., items that were purchased), to generate 410 labeled data for items for which the specific interaction was not performed (e.g., items that were not purchased) in the training dataset, the modeling engine 218 samples items offered by the warehouse 110 from which items for which the specific interaction was performed to generate labeled data for items for which the specific interaction was not performed (e.g., other items offered by a warehouse 110 from which an order including an item was received that were not included in the order). In some embodiments, the modeling engine 218 retrieves an inventory of items offered by the warehouse 110 from which the user performed the specific interaction (e.g., from an order including an item was received) and randomly selects items offered by the warehouse 110 that for which the specific interaction was not performed (e.g., items that were not included in the purchase) and labels characteristics of the user and attributes of the randomly selected items as not having the specific interaction performed by the user. Alternatively, the modeling engine 218 determines a popularity distribution of items previously purchased by users from the warehouse 110 (or for which a user previously performed the specific interaction) from which the selected purchase was made and selects additional items that were not included in the selected purchase (or for which the user did not perform the specific interaction) based on the popularity distribution of previously purchased items (or items for which the specific interaction was previously performed) and labels combinations of attributes of the selected additional item and characteristics of the user as not purchased (or for which the specific interaction was not performed). When generating 410 labeled data, the modeling engine 218 generates a specified ratio of items labeled with the specific interaction being performed (e.g., as purchased) to items labeled with the specific interaction not being performed (e.g., as not purchased) in some embodiments. For example, the labeled data includes a ratio of three items labeled as not purchased to one item labeled as purchased, although the modeling engine 218 may use different ratios in different embodiments.

Additionally, the modeling engine 218 identifies users who performed the specific interaction (e.g., made the purchases) and retrieves characteristics of the identified users. For an identified user, the modeling engine 218 identifies an item embedding for each item included in the purchase or for which the user performed the specific interaction, an embedding corresponding to search terms the online concierge system 102 received from the user, preferences of the user, a length of time the user has used the online concierge system 102, information describing warehouses 110 from which the user previously made purchases, and may identify other information maintained for the user or for purchases made by the user via the online concierge system 102. In some embodiments, the modeling engine 218 additionally identifies embeddings corresponding to words or phrases the online concierge system 102 received from the user when the order was identifying items for the purchase. In some embodiments, for the identified user, the modeling engine 218 retrieves additional purchases previously made by the user or additional transactions where the user performed the specific interaction with an item from the transaction records database 208 and averages item embeddings for items included in purchase previously made by the user or item embeddings for items for which the user performed the specific interaction, resulting in an embedding representing a purchase history of the user. Hence, the training data includes an item embedding for an item, a user embedding for a user, and a label indicating whether the user performed the specific interaction with the item (e.g., a label indicating whether the item was purchased or was not purchased by the user). In various embodiments, the training data includes additional features along with the item embedding and the user embedding, with a label applied to a combination of an item embedding, a user embedding, and the other features.

The modeling engine 218 applies 415 the model to the labeled training data, generating a probability of a user performing the specific interaction with an item based on the user embedding for the user from the user model and the item embedding for the item from the item model. The modeling engine 218 compares 420 the generated probability of the user performing the specific interaction with the item to the label applied to the combination of the user embedding of the user and the item embedding of the item. If the comparison indicates the probability generated by the model differs from the label applied to the combination of the user embedding for the user and the item embedding of the item (e.g., the generated probability is below a threshold for performing the specific interaction with the item when the label indicates the specific interaction with the item was performed or the generated probability is above a threshold for performing the specific interaction with the item when the label indicates the specific interaction was not performed), the modeling engine 218 modifies one or more parameters of the model using any suitable supervised learning method. For example, the modeling engine 218 backpropagates the one or more error terms from the label applied to an example of the training data and the output of the model. One or more parameters of the model are modified through any suitable technique from the backpropagation of the one or more error terms through the layers of the network. The error term may be generated through any suitable loss function, or combination of loss functions, in various embodiments. When updating parameters of the model, the modeling engine 218 may modify one or more parameters of the user model or of the item model. The modeling engine 218 may iteratively modify the model a specified number of times or until one or more criteria are satisfied using any suitable supervised learning method. For example, the modeling engine 218 iteratively modifies the model until a loss function based on a difference between a label applied to an example of the training data and a probability generated by the model satisfies one or more conditions.

Incrementally Updating Item Embeddings and User Embeddings Input to a Model

Figure 5:
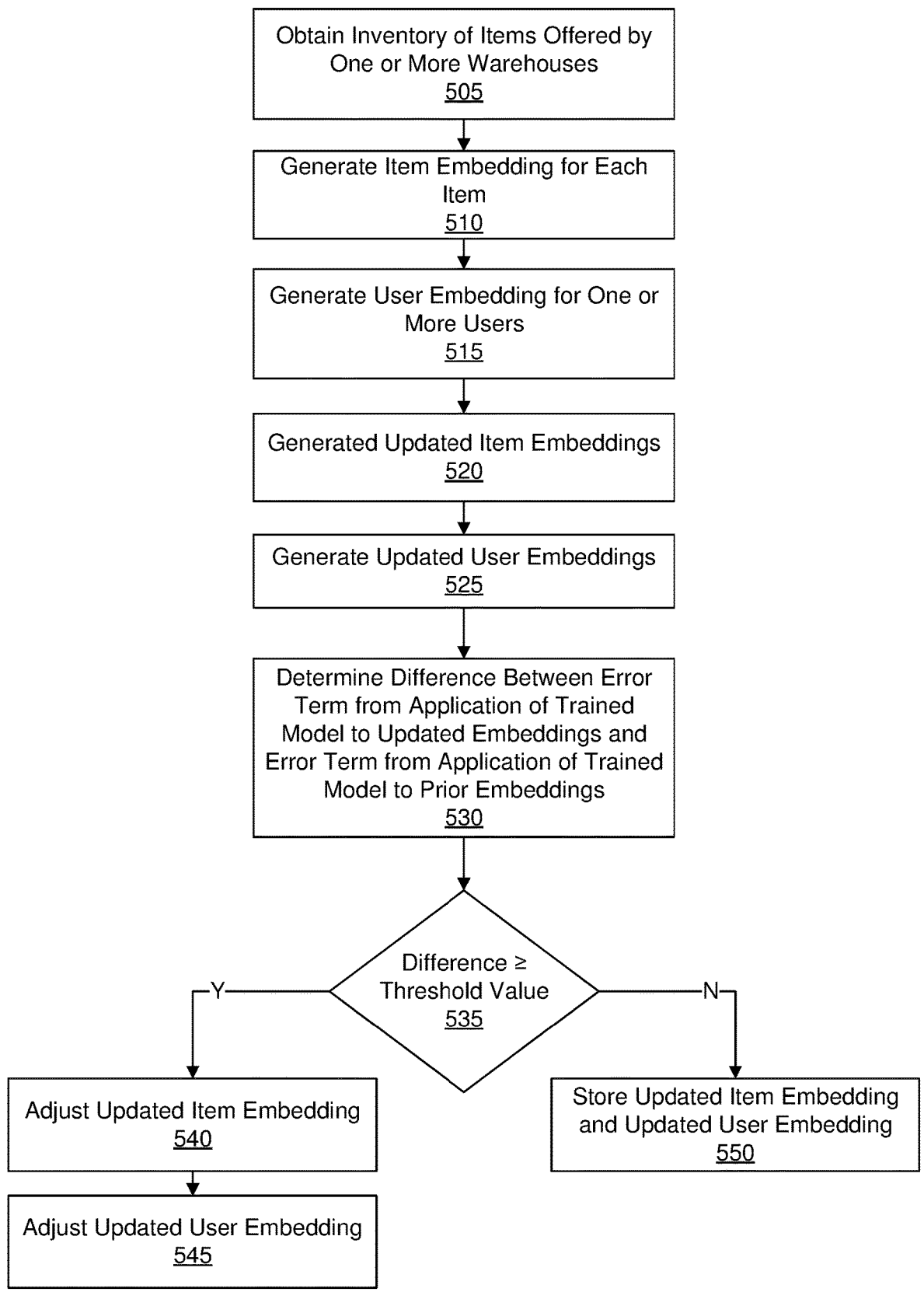
FIG. 5 is a flowchart of a method for updating user embeddings and item embeddings that are input to a model determining a likelihood of a user performing an interaction with an item, according to one embodiment.

FIG. 5 is a flowchart of one embodiment of a method for updating user embeddings and item embeddings that are input to a model determining a likelihood of a user performing an interaction with an item. In various embodiments, the method includes different or additional steps than those described in conjunction with FIG. 5. Further, in some embodiments, the steps of the method may be performed in different orders than the order described in conjunction with FIG. 5. The method described in conjunction with FIG. 5 may be carried out by the online concierge system 102 in various embodiments.

The online concierge system 102 obtains 505 an inventory of items offered by one or more warehouses 110. In some embodiments, the online concierge system 102 obtains 505 an inventory from each warehouse 110, with an inventory from a warehouse identifying items offered by the warehouse 110. The inventory includes different entries, with each entry including information identifying an item (e.g., an item identifier, an item name) and one or more attributes of the item. Example attributes of an item include: one or more keywords, a brand offering the item, a manufacturer of the item, a type of the item, a price of the item, a quantity of the item, a size of the item and any other suitable information. Additionally, one or more attributes of an item may be specified by the online concierge system 102 for the item and included in the entry for the item in the inventory. Example attributes specified by the online concierge system 102 for an item include: a category for the item, one or more sub-categories for the item, and any other suitable information for the item.

From the information about various items in the inventory and information stored by the online concierge system 102 describing prior interactions by users of the online concierge system 102 selecting items, the online concierge system 102 generates 510 an item embedding for each item. As further described above in conjunction with FIG. 4, the online concierge system 102 generates 510 the item embedding for an item by applying an item model to attributes of the item. In some embodiments, one or more dimensions for an item embedding are determined from different words or phrases received by the online concierge system 102 as terms from users in interactions where the user selected the item. Frequencies with which words or phrases were received by the online concierge system 102 in interactions where a user selected the item are used when determining one or more dimensions of the item embedding for the item. The online concierge system 102 maintains a stored vocabulary of words for determining item embeddings in various embodiments. Categories associated with the item by the online concierge system 102, such as a department within a warehouse 110 including an item may also be used to determine one or more dimensions of an item embedding for an item. When determining values of dimensions of embeddings for an item, the online concierge system 102 may evaluate interactions in which items were selected by users that occurred within a specified time interval (e.g., within 180 days of a current date). Alternatively or additionally, the online concierge system 102 orders items by dates when a user purchased or selected the items and generates 510 embeddings for items having at least a threshold position in the ordering, allowing generation of the embeddings for more recently purchased or selected items.

The online concierge system 102 additionally generates 515 user embeddings for users of the online concierge system 102 by applying a user model to characteristics of the user, as further described in conjunction with FIG. 4. For example, the online concierge system 102 identifies a user from whom a request for one or more items was received and generates 515 the embedding for the user. Alternatively, the online concierge system 102 periodically generates 515 embeddings for users who have accessed the online concierge system 102 or for users who have accessed the online concierge system 102 within a specific time interval (e.g., within a threshold amount of time of a current time). To generate 515 the user embedding for the user, the online concierge system 102 identifies items selected or purchased by the user and retrieves embeddings for the identified items. In some embodiments, the online concierge system 102 identifies items that the user purchased within a particular time interval (e.g., within 180 days of a current date), retrieves embeddings for the identified items, and generates 515 a user embedding for the user with one or more dimensions of the embeddings determined from different items and values of the dimensions determined from frequencies with which the user purchased products corresponding to the dimensions. In various embodiments, the online concierge system 102 averages values of the dimensions based on a number of purchases by the user and generates 515 the user embedding for the user from the average values of the dimensions. Additionally, one or more dimensions of the user embedding for the user are determined from characteristics of the user maintained by the online concierge system 102. Example characteristics of a user include one or more dietary preferences or restrictions of the user, frequency of purchases from the warehouse 110 by the user, and any other suitable information maintained by the online concierge system 102.

Additionally, the online concierge system 102 maintains a trained similarity model that receives a user embedding and an item embedding as input, with the similarity model outputting a measure of similarity of the user corresponding to the user embedding and an item corresponding to the item embedding. In various embodiments, the user embeddings from the user model and item embeddings from the item model have an equal number of dimensions, with the similarity model determining based on a measure of similarity between a user embedding and an item embedding, such as a dot product of the user embedding and the item embedding. In various embodiments, a probability of the user purchasing an item determined from the trained model further described above in conjunction with FIG. 4 is directly related to the dot product of the embedding for the user and the embedding for the item. In some embodiments, the online concierge system 102 selects a subset of items for a user based on application of the similarity model to a user embedding for the user and item embeddings for various items and subsequently applies trained model described above in conjunction with FIG. 4 to combinations of a user embedding for the user and item embeddings for items of the subset. In other embodiments, the online concierge system 102 identifies items for a user using any suitable method and applies the trained model to combinations of item embeddings of identified items and a user embedding of the user.

Figure 6:
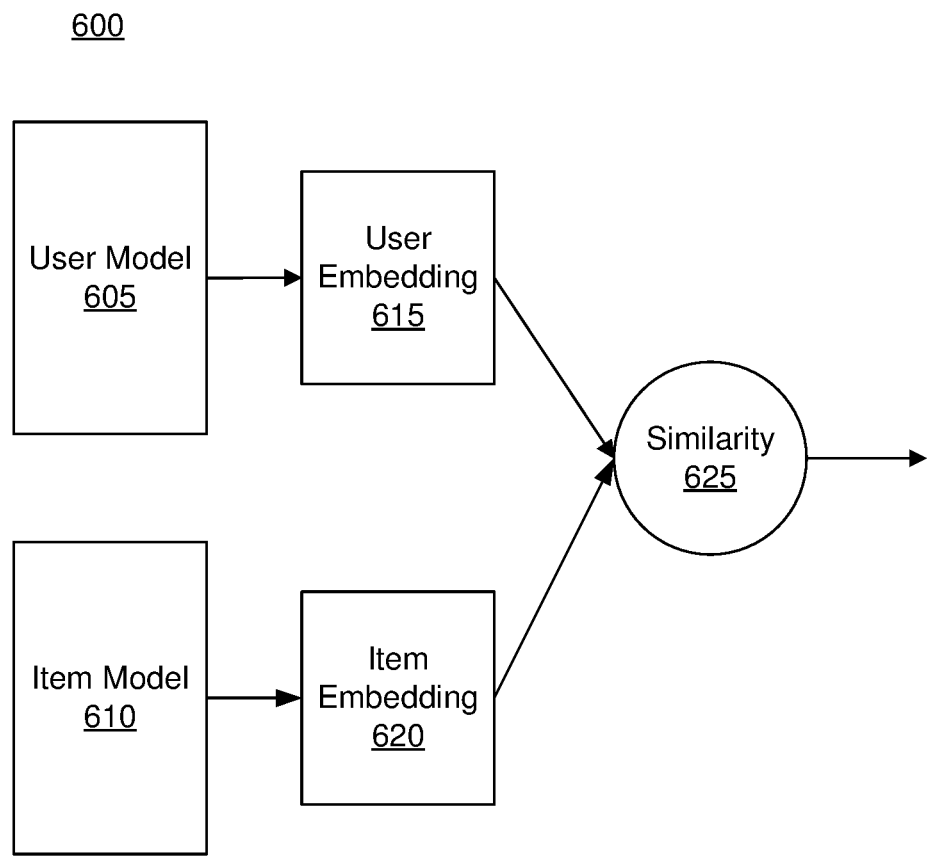
FIG. 6 is a process flow diagram of a trained similarity model determining a similarity between a user and an item, in accordance with an embodiment.

FIG. 6 shows a process flow diagram of one embodiment of a similarity model 600. As shown in the example of FIG. 6, the similarity model 600 includes a user model 605 and an item model 610. As further described above in conjunction with FIG. 4, the user model 605 generates a user embedding 615 for a user based on characteristics of the user, while the item model 610 generates an item embedding 620 for an item based on attributes of the item. In the example shown by FIG. 6, the model 600 determines a similarity 625 between the user embedding 615 and the item embedding 620. The similarity 625 is a dot product of the user embedding 615 and the item embedding 620 in some embodiments, while in other embodiments the model 600 determines the similarity 625 between the user embedding 615 and the item embedding 620 using any suitable technique (e.g., cosine similarity, Euclidean distance, etc.). As shown in FIG. 6, the user model 605 and the item model 610 are discrete models separately maintained by the online concierge system 102 and used in the model 600.

Referring back to FIG. 5, as further described above, the user embeddings and the item embeddings account for interactions by users with items, which change over time. To account for these interactions, the online concierge system 102 generates 520 updated item embeddings and generates 525 updated user embeddings. In various embodiments, the online concierge system 102 generates 520 updated item embeddings at a periodic interval, such as daily. In some embodiments, updated item embeddings for items are generated 520 at different intervals for different warehouses 110. Similarly, updated user embeddings may be generated 525 at a periodic interval, such as daily, in various embodiments. The online concierge system 102 uses the same periodic interval to generate 520 updated item embeddings and to generate 525 updated user embeddings in some embodiments, while in other embodiments, different periodic intervals are used for generating 520 updated item embeddings and for generating 525 updated user embeddings.

However, generating 520 updated item embeddings may change the latent space of the updated item embeddings relative to the item embeddings, while generating 525 updated user embeddings may similarly change the latent space of the updated user embeddings relative to the user embeddings. Such changes in the underlying latent space of the item embeddings or of the user embeddings decreases accuracy of the trained model when applied to the updated user embeddings and to the updated item embeddings. Retraining the trained model when updated item embeddings are generated 520 or when updated user embeddings 525 are generated is computationally intensive.

To maintain accuracy of the similarity model while updating the item embeddings and the user embeddings, the online concierge system 102 generates 520 updated item embeddings by initializing item embeddings to the previously generated 510 item embeddings, which initializes weights between layers of a network comprising the item model based on the previously generated item embeddings and applying the item model to new training data including a plurality of examples of items and determining an error term from a difference between the label applied to the example of the training data and an output of the item model. The error term may be generated through any suitable loss function, or combination of loss functions, in various embodiments. For example, the loss function is a mean squared error between an output of the item model (or of the similarity model) for an example of the training data and a label applied to the example of the training data. In other embodiments, the loss function is based on a difference between a measure of similarity between a user embedding and an item embedding of an example of the training data output by the similarity model (e.g., a dot product of the user embedding and the item embedding of the example) and a label applied to the example of the training data. However, in other embodiments, any loss function or combination of loss functions, may be applied to an output of the item model, or an output of the similarity model, for an example of the new training data and a label applied to the example of the training data to generate the error term.

The online concierge system 102 repeatedly backpropagates the one or more error terms from the label applied to an example of the new training data and the output of the item model, or the output of the similarity model, for the new training data through layers of a network comprising the item model. One or more parameters of the network are modified through any suitable technique from the backpropagation of the one or more error terms through the layers of the network. For example, weights between nodes of the network, such as nodes in different layers of the network, are modified to reduce the one or more error terms. The backpropagation of the one or more error terms is repeated by the online concierge system 102 until the one or more loss functions satisfy one or more criteria. For example, the one or more criteria specify conditions for when the backpropagation of the one or more error terms through the layers of the network is stopped. In some embodiments, the online concierge system 102 uses gradient descent or any other suitable process to minimize the one or more error terms in various embodiments.

In response to the one or more loss functions satisfying the one or more criteria and the online concierge system 102 stopping the backpropagation of the one or more error terms, the online concierge system 102 stores the set of parameters for the layers of the network. When the item model is applied to an item, an updated item embedding is generated 520 from weights of the layers of the item model, such as weights of connections between nodes in the network as the set of parameters. The item model may be any machine learning model, such as a neural network, boosted tree, gradient boosted tree or random forest model in various embodiments. In some examples, the item model is trained via a XGBoost process when the item model is applied to examples of the new training data.

Similarly, the online concierge system 102 generates 525 updated user embeddings by initializing user embeddings to the previously generated 515 user embeddings, which initializes weights between layers of a network comprising the user model based on the previously generated user embeddings and applying the user model to new training data including a plurality of examples of users and determining an error term from a difference between the label applied to the example of the training data and an output of the user model. The error term may be generated through any suitable loss function, or combination of loss functions, in various embodiments. For example, the loss function is a mean squared error between an output of the user model (or of the similarity model) for an example of the training data and a label applied to the example of the training data. In other embodiments, the loss function is based on a difference between a measure of similarity between a user embedding and an item embedding of an example of the training data output by the similarity model (e.g., a dot product of the user embedding and the item embedding of the example) and a label applied to the example of the training data. However, in other embodiments, any loss function or combination of loss functions, may be applied to an output of the user model (or of the similarity model) for an example of the new training data and a label applied to the example of the training data to generate the error term.

The online concierge system 102 repeatedly backpropagates the one or more error terms from the label applied to an example of the new training data and the output of the user model for the new training data through layers of a network comprising the user model. One or more parameters of the network are modified through any suitable technique from the backpropagation of the one or more error terms through the layers of the network. For example, weights between nodes of the network, such as nodes in different layers of the network, are modified to reduce the one or more error terms. The backpropagation of the one or more error terms is repeated by the online concierge system 102 until the one or more loss functions satisfy one or more criteria. For example, the one or more criteria specify conditions for when the backpropagation of the one or more error terms through the layers of the network is stopped. In some embodiments, the online concierge system 102 uses gradient descent or any other suitable process to minimize the one or more error terms in various embodiments.

In response to the one or more loss functions satisfying the one or more criteria and the online concierge system 102 stopping the backpropagation of the one or more error terms, the online concierge system 102 stores the set of parameters for the layers of the network. When the user model is applied to a user, an updated user embedding is generated 525 from weights of the layers of the user model, such as weights of connections between nodes in the network as the set of parameters. The user model may be any machine learning model, such as a neural network, boosted tree, gradient boosted tree or random forest model in various embodiments. In some examples, the user model is trained via a XGBoost process when the user model is applied to examples of the new training data.

To evaluate the effect of the updated item embeddings and the updated user embeddings on a separate trained model determining a probability of the user performing an interaction with the item, the online concierge system 102 obtains a set of evaluation data. Example interactions with the item include: purchasing the item, selecting a content item corresponding to the item, storing information describing the item, or any other suitable interaction. For example, the user model and the item model are components of a similarity model, as further described above in conjunction with FIG. 6, and the trained model is a separate model that determines a probability of the user performing an interaction with the item, as further described above in conjunction with FIG. 4. The evaluation data includes examples each comprising a combination of an item and a user, with a label applied to each example indicating whether the user performed the specific interaction corresponding to the trained model to the item. The online concierge system 102 applies the trained model to a combination of an updated item embedding and an updated user embedding corresponding to a combination of an item and a user of the evaluation data and determines an updated error term from a label applied to the combination by the evaluation data and an output of the trained model applied to the combination of the updated item embedding and the updated user embedding. The online concierge system 102 also applies the trained model to an item embedding and a user embedding previously generated for the combination of the item and the user of the evaluation data and determines an existing error term from a label applied to the combination by the evaluation data and an output of the trained model applied to the combination of the item embedding and the user embedding. In various embodiments, the updated error term and the existing error term are generated using any suitable loss function, such as a log loss function.

The online concierge system 102 determines 530 a difference between the updated error term and the existing error term for the trained model when applied to the combination of the item and the user of the evaluation data. Additionally, the online concierge system 102 determines 535 whether the difference between the updated error term and the existing error term equals or exceeds a threshold value. For example, the online concierge system 102 determines whether the difference between the updated error term and the existing error term equals or exceeds zero. The comparison of the difference between the updated error term and the existing error term to the threshold value determines whether the updated user embedding and the updated item embedding decreases performance of the trained model relative to use of the item embedding and the user embedding.

In response to determining 535 the difference between the updated error term and the existing error term is not less than the threshold value, the online concierge system 102 determines the updated item embedding and the updated user embedding decreased performance of the trained model relative to use of the item embedding and the user embedding. To offset the reduced performance of the trained model, the online concierge system 102 adjusts 540 the updated item embedding and adjusts 545 the updated user embedding. In various embodiments, the online concierge 102 adjusts 540 the updated item embedding using an adjustment term based on the difference between the updated error term from application of the trained model to the updated item embedding and to the updated user embedding and the existing error term from application of the trained model to the item embedding and to the user embedding. For example, the adjustment term is based on a gradient of the difference between the updated error term and the existing error term. In various embodiments, an adjustment weight is applied to the adjustment term, and an updated item embedding is adjusted 540 based on a product of the adjustment weight and the adjustment term for the modified item embedding. For example, the updated item embedding is adjusted 540 by decreasing the updated item embedding by the product of the adjustment weight and the adjustment term for the modified item embedding.

Similarly, the online concierge 102 adjusts 545 the updated user embedding using an adjustment term based on the difference between the updated error term from application of the trained model to the updated user embedding and to the updated item embedding and the existing error term from application of the trained model to the user embedding and to the user embedding. For example, the adjustment term is based on a gradient of the difference between the updated error term and the existing error term. In various embodiments, the adjustment weight is applied to the adjustment term, and an updated user embedding is adjusted 545 based on a product of the adjustment weight and the adjustment term for the modified user embedding. For example, the updated user embedding is modified 545 by decreasing the updated user embedding by the product of the adjustment weight and the adjustment term for the modified user embedding. In various embodiments, the adjustment weight is determined by the online concierge system 102 using any suitable method. In some embodiments, the adjustment weight is a value determined by the online concierge system 102 to satisfy one or more criteria and stored by the online concierge system 102. For example, the online concierge system 102 applies the trained model to a combination of adjusted updated embeddings (an adjusted updated user embedding and an adjusted updated item embedding) and determines a difference between an adjusted error term from application of the trained model to a combination of an item and a user from the exploration data using the adjusted updated item embedding or the adjusted updated user embedding and the existing error term for the trained model when applied to a combination of the item and the user of the evaluation data. In response to the difference between an adjusted error term and the existing error term equaling or exceeding a maximum value, the online concierge system 102 changes the adjustment weight and re-determines the adjusted item embedding or the adjusted user embedding, as further described above using the changed adjustment weight. The online concierge system 102 iteratively changes the adjustment weight based on the difference between the adjusted error term and the existing error term equaling or exceeding a maximum value until the difference between the adjusted error term and the existing error term is less than the maximum value.

The online concierge system 102 stores the adjusted updated user embedding or the adjusted updated item embedding. By adjusting an updated user embedding or an updated item embedding based on a loss function describing application of the trained model to the updated user embedding or the updated item embedding, the online concierge system 102 accounts for relative performance of the trained model when the updated user embeddings or the updated item embeddings are used relative to use of the user embeddings or the item embeddings. This prevents the updated user embeddings or the updated item embeddings from impairing performance of the trained model by adjusting the updated user embeddings or the updated item embeddings when application of the trained model to the updated user embeddings or to the updated item embeddings decreases accuracy of the trained model.

Further, in response to determining 535 the difference between the updated error term and the existing error term is less than the threshold value, the online concierge system 102 determines the updated item embedding or the updated user embedding do not decrease performance of the trained model relative to use of the item embedding and the user embedding. Hence, the online concierge system 102 stores 550 the updated item embedding or the updated user embedding without additional modification for subsequent use. This allows the online concierge system 102 to subsequently use the updated user embedding or the updated item embedding when the accuracy of the trained model is not decreased by the updated user embedding or by the updated item embedding.

Figure 7:
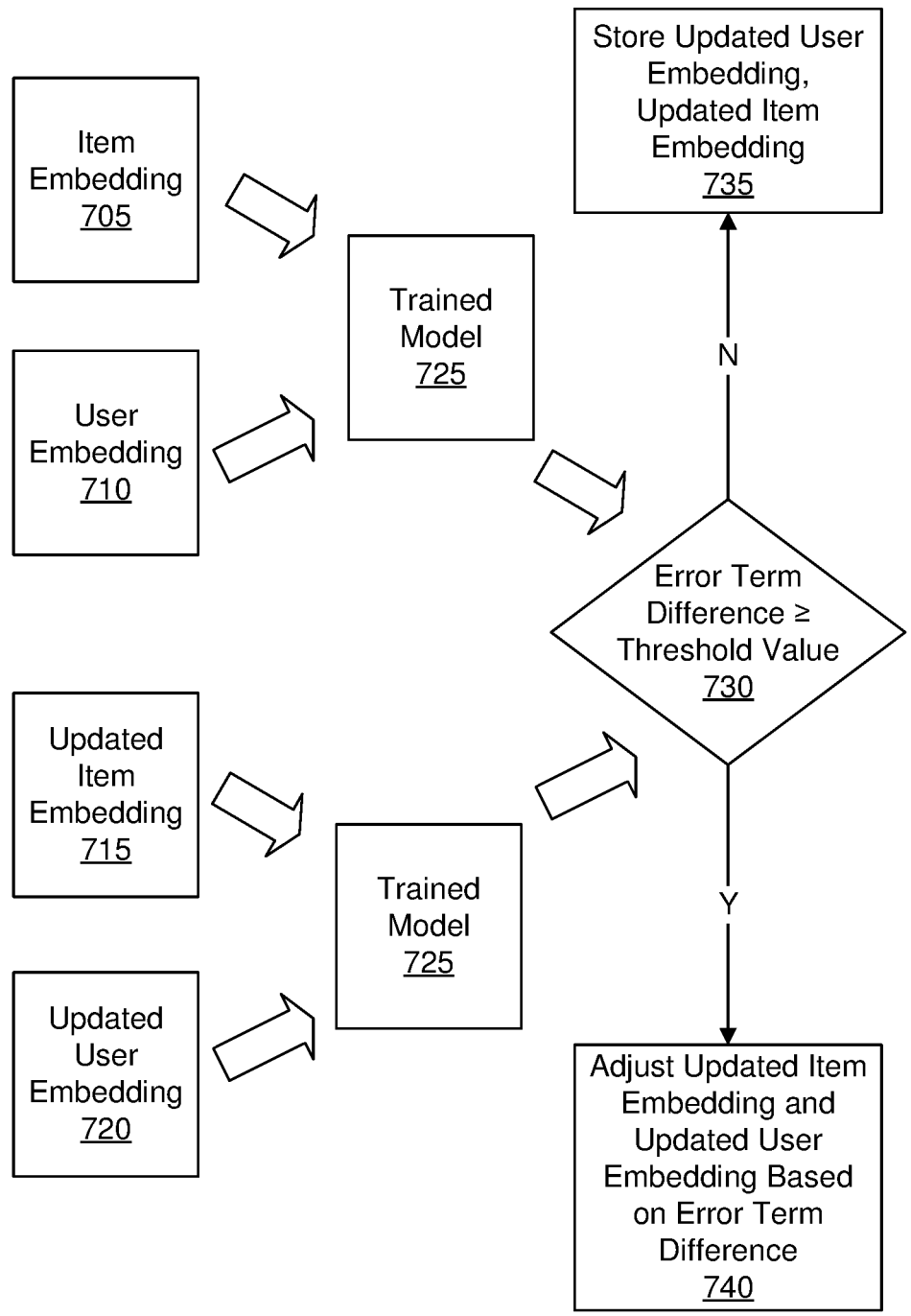
FIG. 7 is a process flow diagram of a method for updating user embeddings and item embeddings that are input to a model determining a likelihood of a user performing an interaction with an item, in accordance with an embodiment.

FIG. 7 is a process flow diagram of a method for updating user embeddings and item embeddings that are input to a model determining a likelihood of a user performing an interaction with an item. As further described above in conjunction with FIG. 5, the online concierge system 102 generates and stores item embeddings 705 for items offered by one or more warehouses 110 and user embeddings 710 for users of the online concierge system 102. The item embeddings 705 and the user embeddings 710 are determined at least in part from interactions by users with items via the online concierge system 102.

As users interact with items via the online concierge system 102, the stored item embeddings 705 and the stored user embeddings 710 generates updated item embeddings 715 and updated user embeddings 720. As further described above in conjunction with FIG. 5, the online concierge system 102 generates the updated item embeddings 715 from the stored item embeddings 705 and similarly generates the updated user embeddings 720 from the stored user embeddings 710 For example, the online concierge system 102 initializes an item model based on the stored item embeddings 705 and initializes a user model based on the stored user embeddings 710. In some embodiments, the online concierge system 102 generates updated item embeddings 715 by applying the item model initialized to the stored item embeddings 705 to items in a set of new training data from more recent interactions by users with items, as further described above in conjunction with FIG. 5. Similarly, in some embodiments, the online concierge system 102 generates updated user embeddings 720 by applying the user model initialized to the stored user embeddings 710 to users in a set of new training data from more recent interactions by users with items, as further described above in conjunction with FIG. 5.

As the online concierge system 102 uses item embeddings and user embeddings as inputs to a trained model 725 that outputs a probability of a user corresponding to a user embedding performing a specific interaction with an item corresponding to an item embedding. Example interactions include: purchasing an item, adding the item to a cart, storing information about the item, selecting a content item corresponding to the item, or any other suitable interaction. As the updated item embeddings 715 and the updated user embeddings 720 may be in a different latent space than the latent space of the previous item embeddings 705 and the previous user embeddings 710, the updated user embeddings 720 and the updated item embeddings 715 may impair performance of the trained model 725.

To prevent the updated user embeddings 720 and the updated item embeddings 715 from impairing accuracy of the trained model 725, the online concierge system 102 applies the trained model 725 to the stored item embeddings 705 and to the stored user embeddings 710 and generates an existing error term from application of a loss function to the output of the trained model 725 applied to the stored item embeddings 705 and to the stored user embeddings 710. Similarly, the online concierge system 102 applies the trained model 725 to the updated item embeddings 715 and to the updated user embeddings 720 and generates an updated error term from application of a loss function to the output of the trained model 725 applied to the updated item embeddings 715 and to the updated user embeddings 720.

As further described above in conjunction with FIG. 5, the online concierge system 102 determines a difference between the updated error term and the existing error term and determines 730 whether the difference equals or exceeds a threshold value. This determination 730 allows the online concierge system 102 to determine if the updated item embeddings 715 and the updated user embeddings 720 decreased performance of the trained model 725 using the error terms from application of the trained model 725 to the stored item embeddings 705 and to the stored user embeddings 710 and from application of the trained model 725 to the updated item embeddings 715 and to the updated user embeddings 720. In response to determining 735 the difference does not equal or exceed the threshold value, the online concierge system 102 stores 730 the updated item embeddings 715 and the updated user embeddings 720. Hence, determining 735 the difference does not equal or exceed the threshold value indicates that the updated item embeddings 715 and the updated user embeddings 720 do not reduce an accuracy of the trained model 725 in predicting a likelihood of a user performing a specific interaction with an item more than a threshold amount that is specified by the threshold value.

However, in response to determining 735 the difference equals or exceeds the threshold value, the online concierge system 102 determines that the updated item embeddings 715 and the updated user embeddings 720 impair ability of the trained model 725 to predict the likelihood of the user performing the specific interaction with the item more than a threshold amount. As retraining the trained model 725 using the updated item embeddings 715 and the updated user embeddings 720 is computationally intensive, to update the embeddings to account for more recent user interaction patterns while preserving the accuracy of the trained model 725, the online concierge system 102 adjusts 740 the updated item embeddings 715 or the updated user embeddings 720 based on the determined difference. This allows the online concierge system 102 to mitigate changes from the stored item embeddings 705 to the updated item embeddings 715 or from the stored user embeddings 710 to the updated user embeddings 720 that decrease accuracy of the trained model 725 when applied to the updated item embeddings 715 and to the updated user embeddings 720, as further described above in conjunction with FIG. 5.

While FIGS. 5-7 describe an online concierge system 102 updating user embeddings and item embeddings that are input to a model determining a likelihood of a user performing an interaction with an item, the method described in conjunction with FIGS. 5-7 may be used by an online system that displays content items to users and receives interactions by users with the content items. The online system receives a set of content items for display by the online system, each content item having one or more attribute and generates item embedding for each content item by applying an item model to attributes of the item from the set and to prior interactions by users of the online system with content items displayed by the online system. Additionally, the online system, generates an embedding for one or more users of the online concierge system by applying a user model to characteristics of a user and to content items with which the user previously interacted via the online system, with the user model separate from the item model as further described above in conjunction with FIGS. 5 and 6. When the online system obtains new training data including a plurality of examples of content items and of users that account for more recent interactions by users of the online system with content items, the online system generates updated item embeddings by applying the item model initialized based on the item embeddings to content items of the new training data and generates updated user embeddings by applying the user model initialized based on the user embeddings to users of the new training data. The online system retrieves a trained model configured to receive an input combination of a particular user and a particular content item and to output a probability of the specific user performing a specific interaction with the particular content item. To evaluate effect of the updated user embeddings and the updated item embeddings on the trained model, the online system obtains evaluation data including examples each comprising a combination of the content item and the user with a label applied to each example indicating whether the user performed the specific interaction corresponding to the trained model to the content item. As further described above in conjunction with FIGS. 5 and 7, the online system determines existing error term for the trained model from application of the trained model to an item embedding of a content item in an example and to a user embedding of a user in the example and determines an updated error term for the trained model from application of the trained model to an updated item embedding of the content item in an example and to an updated user embedding of the user in the example. As further described above in conjunction with FIGS. 5 and 7, responsive to determining a difference between the updated error term and the existing error term is not less than a threshold value, the online system adjusts one or more of the updated item embeddings based on the updated error term and the existing error term and adjusts one or more of the updated user embeddings based on the updated error term and the existing error term. The online system stores the adjusted one or more updated item embeddings and stores the one or more adjusted updated user embeddings, as further described above in conjunction with FIGS. 5-7. Hence, the method described above in conjunction with FIGS. 5-7 allows an online system, such as an online concierge system 102, to update embeddings for users and items that accounts for downstream effects of the updated embeddings on other models using the updated embeddings; such downstream awareness of how updated embeddings affect other models allows the online system to update the embeddings without impairing results generated by the other models when the updated embeddings are used.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   obtaining, at an online concierge system, an inventory of items offered by one or more warehouses, the inventory identifying a warehouse offering an item and attributes of the item;
   generating, by the online concierge system, an item embedding for each item by applying an item model to attributes of the item from the obtained inventory and to prior interactions by users of the online concierge system selecting items offered by at least one warehouse, the item embeddings being first latent space vectors in a first latent space of the item model;
   generating, by the online concierge system, a user embedding for one or more users of the online concierge system by applying a user model to characteristics of a user and to items the user previously purchased via the online concierge system, the user model separate from the item model, each user embedding being second latent space vectors in a second latent space of the user model;
   obtaining new training data including a plurality of examples of items and of users that account for more recent interactions by users of the online concierge system with items;
   generating updated item embeddings by applying of the item model initialized based on the item embeddings to items of the new training data;
   generating updated user embeddings by applying of the user model initialized based on the user embeddings to users of the new training data;
   retrieving a trained model configured to receive an input combination of a particular user and a particular item and to output a probability of the particular user performing a specific interaction with the particular item;
   obtaining evaluation data including examples each comprising a combination of the item and the user with a label applied to each example indicating whether the user performed the specific interaction corresponding to the trained model to the item;
   determining an existing error term for the trained model from application of the trained model to an item embedding of an item in an example and to a user embedding of a user in the example;
   determining an updated error term for the trained model from application of the trained model to an updated item embedding of the item in an example and to an updated user embedding of the user in the example, the updated item embedding in the first latent space and the updated user embedding in the second latent space;
   responsive to determining a difference between the updated error term and the existing error term is not less than a threshold value:
      adjusting one or more of the updated item embeddings based on the updated error term and the existing error term; and
      adjusting one or more of the updated user embeddings based on the updated error term and the existing error term;
   retraining the trained model through updating the item embeddings in the first latent space and updating the user embeddings in the second space; and storing the adjusted one or more updated item embeddings and storing the one or more adjusted updated user embeddings.

2. The method of claim 1, wherein the existing error term is determined from a loss function applied to an output from application of the trained model to the item embedding of the item in the example and to a user embedding of the user in the example.

3. The method of claim 2, wherein the loss function is a log loss function.

4. The method of claim 2, wherein the updated error term is determined from the loss function applied to an output from application of the trained model to the updated item embedding of the item in the example and to the updated user embedding of the user in the example.

5. The method of claim 4, wherein the loss function is a log loss function.

6. The method of claim 1, wherein adjusting one or more of the updated item embeddings based on the updated error term and the existing error term comprises:
modifying an updated item embedding by an adjustment term based on the difference between the updated error term and the existing error term.

7. The method of claim 6, wherein modifying the updated item embedding by the adjustment term based on the difference between the updated error term and the existing error term comprises:
modifying the updated item embedding by a product of an adjustment weight and the adjustment term.

8. The method of claim 7, wherein adjusting one or more of the updated user embeddings based on the updated error term and the existing error term comprises:
modifying an updated user embedding by the adjustment term.

9. The method of claim 7, wherein modifying the updated user embedding by the adjustment term comprises:
modifying the updated user embedding by a product of an adjustment weight and the adjustment term.

10. The method of claim 1, further comprising:
responsive to determining the difference between the updated error term and the existing error term less than the threshold value, storing the updated user embeddings and the updated item embeddings.

11. A computer program product comprising a non-transitory computer readable storage medium having instructions encoded thereon that, when executed by a processor, cause the processor to:
obtain, at an online concierge system, an inventory of items offered by one or more warehouses, the inventory identifying a warehouse offering an item and attributes of the item;
generate, by the online concierge system, an item embedding for each item by applying an item model to attributes of the item from the obtained inventory and to prior interactions by users of the online concierge system selecting items offered by at least one warehouse, the item embeddings being first latent space vectors in a first latent space of the item model;
generate, by the online concierge system, a user embedding for one or more users of the online concierge system by applying a user model to characteristics of a user and to items the user previously purchased via the online concierge system, the user model separate from the item model, each user embedding being second latent space vectors in a second latent space of the user model;
obtain new training data including a plurality of examples of items and of users that account for more recent interactions by users of the online concierge system with items;
generate updated item embeddings by applying of the item model initialized based on the item embeddings to items of the new training data;
generate updated user embeddings by applying of the user model initialized based on the user embeddings to users of the new training data;
retrieve a trained model configured to receive an input combination of a particular user and a particular item and to output a probability of the particular user performing a specific interaction with the particular item;
obtain evaluation data including examples each comprising a combination of the item and the user with a label applied to each example indicating whether the user performed the specific interaction corresponding to the trained model to the item;
determine an existing error term for the trained model from application of the trained model to an item embedding of an item in an example and to a user embedding of a user in the example;
determine an updated error term for the trained model from application of the trained model to an updated item embedding of the item in an example and to an updated user embedding of the user in the example, the updated item embedding in the first latent space and the updated user embedding in the second latent space;
responsive to determining a difference between the updated error term and the existing error term is not less than a threshold value:
adjust one or more of the updated item embeddings based on the updated error term and the existing error term; and
adjust one or more of the updated user embeddings based on the updated error term and the existing error term;
retrain the trained model through updating the item embeddings in the first latent space and updating the user embeddings in the second space; and
store the adjusted one or more updated item embeddings and store the one or more adjusted updated user embeddings.

12. The computer program product of claim 11, wherein the existing error term is determined from a loss function applied to an output from application of the trained model to the item embedding of the item in the example and to a user embedding of the user in the example.

13. The computer program product of claim 12, wherein the loss function is a log loss function.

14. The computer program product of claim 12, wherein the updated error term is determined from the loss function applied to an output from application of the trained model to the updated item embedding of the item in the example and to the updated user embedding of the user in the example.

15. The computer program product of claim 14, wherein the loss function is a log loss function.

16. The computer program product of claim 11, wherein adjust one or more of the updated item embeddings based on the updated error term and the existing error term comprises:
modify an updated item embedding by an adjustment term based on the difference between the updated error term and the existing error term.

17. The computer program product of claim 16, wherein modify the updated item embedding by the adjustment term based on the difference between the updated error term and the existing error term comprises:
    modify the updated item embedding by a product of an adjustment weight and the adjustment term.

18. The computer program product of claim 17, wherein adjust one or more of the updated user embeddings based on the updated error term and the existing error term comprises:
    modify an updated user embedding by the adjustment term.

19. The computer program product of claim 17, wherein modify the updated user embedding by the adjustment term comprises:
    modify the updated user embedding by a product of an adjustment weight and the adjustment term.

20. The computer program product of claim 11, wherein the non-transitory computer readable storage medium further has instructions encoded thereon that, when executed by the processor, cause the processor to:
    responsive to determining the difference between the updated error term and the existing error term less than the threshold value, store the updated user embeddings and the updated item embeddings.

21. A system comprising:
one or more processors; and
memory configured to store code comprising instructions, wherein the instructions, when executed by the one or more processors, cause the processor to:
    obtain, at an online concierge system, an inventory of items offered by one or more warehouses, the inventory identifying a warehouse offering an item and attributes of the item;
    generate, by the online concierge system, an item embedding for each item by applying an item model to attributes of the item from the obtained inventory and to prior interactions by users of the online concierge system selecting items offered by at least one warehouse, the item embeddings being first latent space vectors in a first latent space of the item model;
    generate, by the online concierge system, a user embedding for one or more users of the online concierge system by applying a user model to characteristics of a user and to items the user previously purchased via the online concierge system, the user model separate from the item model, each user embedding being second latent space vectors in a second latent space of the user model;
    obtain new training data including a plurality of examples of items and of users that account for more recent interactions by users of the online concierge system with items;
    generate updated item embeddings by applying of the item model initialized based on the item embeddings to items of the new training data;
    generate updated user embeddings by applying of the user model initialized based on the user embeddings to users of the new training data;
    retrieve a trained model configured to receive an input combination of a particular user and a particular item and to output a probability of the particular user performing a specific interaction with the particular item;
    obtain evaluation data including examples each comprising a combination of the item and the user with a label applied to each example indicating whether the user performed the specific interaction corresponding to the trained model to the item;
    determine an existing error term for the trained model from application of the trained model to an item embedding of an item in an example and to a user embedding of a user in the example;
    determine an updated error term for the trained model from application of the trained model to an updated item embedding of the item in an example and to an updated user embedding of the user in the example, the updated item embedding in the first latent space and the updated user embedding in the second latent space;
    responsive to determining a difference between the updated error term and the existing error term is not less than a threshold value:
        adjust one or more of the updated item embeddings based on the updated error term and the existing error term; and
        adjust one or more of the updated user embeddings based on the updated error term and the existing error term;
    retrain the trained model through updating the item embeddings in the first latent space and updating the user embeddings in the second space; and
    store the adjusted one or more updated item embeddings and store the one or more adjusted updated user embeddings.

* * * * *